US00RE36600E

United States Patent [19]

Ito

[11] E Patent Number: Re. 36,600

[45] Reissued Date of Patent: Mar. 7, 2000

[54] INTERNAL PRESSURE ADJUSTING SYSTEM FOR A FUEL TANK AND METHOD THEREOF

[75] Inventor: Takenori Ito, Kawasaki, Japan

[73] Assignee: Fuji Jukogyo Kabushiki Kaisha, Tokyo, Japan

[21] Appl. No.: 09/038,948

[22] Filed: Mar. 12, 1998

Related U.S. Patent Documents

Reissue of:

[64] Patent No.: 5,497,754
Issued: Mar. 12, 1996
Appl. No.: 08/378,263
Filed: Jan. 26, 1995

[30] Foreign Application Priority Data

Jan. 31, 1994 [JP] Japan ..... 6-009519

[51] Int. Cl.[7] ..... F02M 33/02

[52] U.S. Cl. ..... 123/520

[58] Field of Search ..... 123/516, 518, 123/519, 520, 198 D

[56] References Cited

U.S. PATENT DOCUMENTS

| | | | |
|---|---|---|---|
| 4,817,576 | 4/1989 | Abe et al. | 123/518 |
| 5,012,071 | 4/1991 | Redy | 123/518 |
| 5,193,511 | 3/1993 | Fujino | 123/520 |
| 5,197,442 | 3/1993 | Blumenstock et al. | 123/520 |
| 5,259,355 | 11/1993 | Nakashima et al. | 123/520 |
| 5,280,775 | 1/1994 | Tanamura et al. | 123/518 |
| 5,333,590 | 8/1994 | Thomson | 123/520 |
| 5,345,917 | 9/1994 | Muruyama et al. | 123/520 |
| 5,355,864 | 10/1994 | Kuroda et al. | 123/520 |
| 5,396,873 | 3/1995 | Yamanaka et al. | 123/520 |
| 5,398,662 | 3/1995 | Igarashi et al. | 123/520 |

*Primary Examiner*—Thomas N. Moulis
*Attorney, Agent, or Firm*—Smith, Gambrell & Russell, LLP

[57] ABSTRACT

A internal pressure adjusting system and method for a fuel tank mounted on an automobile is to provide a fuel vapor control system preventing from flowing out the fuel vapor to atmosphere while the engine is stopping. The internal pressure adjusting system and method is to further provide a fuel vapor control system preventing from flowing out the fuel vapor to the atmosphere by adjusting the internal pressure of the fuel tank in a proper value when the internal pressure excessively rises during refueling and operating the engine, and preventing from damage of the tank from excessively a negative pressure in the tank. Therefore, it never carelessly flows out the fuel vapor to atmosphere even if the large amount of fuel vapor is generated in the upper space of the fuel tank.

5 Claims, 5 Drawing Sheets

8
9
INJECTOR
20
PURGING SOLENOID VALVE
PRESS. CONT. VALVE
19
8 g
PURGE SOLENOID VALVE DRIVING SECTION
PRESS.CONT. VALVE DRIVING SECTION
8 f
8 d
FUEL INJ. CONT. SECTION
8 e
INT. PRESS. JUDGING SECTION
10
AIR FLOW METER
13
O2 SENSOR
16
CRANK ANGLE SENSOR
15
THROTTLE SENSOR
17
COOLANT TEMP. SENSOR
18
INT. PRESS. SENSOR

INTERNAL PRESSURE ADJUSTING SYSTEM FOR A FUEL TANK AND METHOD THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an internal pressure adjusting device which adjusts an internal pressure in a fuel tank mounted on the vehicle within a proper range.

2. Description of the Prior Art

Fuel vapor in the fuel tank flows into the in atmosphere from a fuel filler cap where refueling the fuel tank, and pollutes the atmosphere when an upper space in the fuel tank is full of the fuel vapor.

For preventing such air pollution, a canister is provided to adsorb the fuel vapor filled in the upper space of the fuel tank.

Thereafter, the absorbed fuel vapors in the canister are induced in an intake system of an engine through a purge passage to burn in a combustion chamber of the engine when operating the engine.

Heretofore, as to the fuel vapor control system of this type, there has been well known as a prior art technique in the Japanese Patent Application Laid Open Number 202812/1993 by the way of example.

Here, the following is disclosed that a normally opened solenoid valve (pressure control valve) controlled by an electronic control unit is provided in a fuel vapor passage and a duty solenoid valve (purge solenoid valve) controlled by the electronic control unit is mounted on a purge passage. The electronic control unit is provided to control the duty solenoid valve in a duty control responsive to the engine operating conditions to open the purge passage.

As a result, the fuel vapor adsorbed in the canister is purged within the engine intake system through the purge passage.

During this purging, the fuel vapor passage is closed by the closed control of the normal opened solenoid valve only when the internal pressure of the tank is below a predetermined value.

Therefore, a negative pressure in the intake passage of the engine only acts to the canister through the purge passage in the fuel vapor control system during the purging described in the above application.

Therefore, the fuel vapor adsorption ability of the canister is promptly recovered by the reason of that the evaporation fuel adsorbed in the canister is surely purges and induced in the intake passage, to prevent decreasing the fuel vapor adsorption ability without enlarging the canister.

In the fuel vapor control system described in the reference, a large amount of fuel vapor generates in the upper space of the fuel tank while the engine is stopping, because the normally opened pressure control valve mounted on the fuel vapor passage opens at stopping the engine.

In that case, the fuel vapor blows out from the fuel vapor passage to the atmosphere through the canister.

In general, the internal pressure in the fuel tank decreases when the fuel temperature in the tank decreases or the atmospheric pressure rises, at engine operating conditions. As a result, the internal pressure in the tank will be made a negative pressure, before long.

In the fuel vapor control system described in the reference, the negative pressure in the fuel tank decreases more and more by closing the fuel vapor passage and opening the purge passage during executing the purge and operating the fuel vapor control and tended to damage the fuel tank by the excessively decreasing the internal pressure in the fuel tank.

SUMMARY OF THE INVENTION

An object of the present invention is to provide a fuel vapor control system preventing the fuel vapor from flowing out to atmosphere while the engine is stopping.

A further object of the present invention is to provide a fuel vapor control system preventing the fuel vapor from flowing out to the atmosphere by adjusting the internal pressure of the fuel tank in a proper value when the internal pressure excessively rises during refueling and operating the engine, and preventing from the damage of the tank by a negative pressure in the tank excessively.

An another object of the present invention is to provide a fuel vapor control system which comprises a normally closed pressure control valve to control a fuel vapor passage connecting between a fuel tank and a canister, and a purge control valve to control a purge passage provided between the canister and an engine intake passage. The pressure control valve is controlled by an internal pressure of the fuel tank, and the purge control valve is controlled by an engine operating conditions according to an electronic control system.

The electronic control system of the present invention is provided to control the pressure control valve to close when the internal pressure of the fuel tank is in a pressure range between a predetermined positive and a predetermined negative pressure, and to open when the internal pressure goes down below the predetermined negative pressures during the engine operating condition, as a result of that the purge solenoid valve is closed.

The electronic control system of the present invention is further provided to control the normally closed pressure control valve to close the fuel vapor passage when the engine does not operate.

Therefore, it never flows out the fuel vapor to the atmosphere even if the large amount of fuel vapor is generated in the upper space of the fuel tank.

When the engine starts while the large amount of the fuel vapor is filled in the fuel tank and the internal pressure of the tank is rising more than the predetermined positive pressure, the electronic control unit controls to open the pressure control valve, and then the fuel vapor passage is opened.

When the engine is operating and the internal pressure of the tank exceeds than the predetermined positive pressure, the electronic control unit controls to open the pressure control valve, the evaporation passage is opened.

Therefore, the fuel vapor filled in fuel tank is adsorbed in the canister through the fuel vapor passage and the internal pressure of the tank promptly goes down below the predetermined positive pressure, as a result of that no fuel vapor flows out to the atmosphere even if the fuel filler cap of the fuel tank is opened at refueling. When the internal pressure in the fuel tank descends below the predetermined positive pressure at operating the engine, the electronic control unit controls to close the pressure control valve, the fuel vapor passage is closed.

In this condition, the internal pressure in the fuel tank further goes down below the predetermined negative pressure according to lowering the fuel temperature in the tank or increasing the atmospheric pressure.

However, when the internal pressure of the fuel tank goes down below the predetermined negative pressure, the electronic control system actuates to open the pressure control valve and to close the purge solenoid valve so as to open the evaporation passage and closes the purge passage.

Therefore, the fuel tank is prevented from damaging by the excessive negative pressure in the tank, since the atmosphere surely flows from the canister to the upper space in the fuel tank through the evaporation passage and the internal pressure of the tank promptly rises over the predetermined negative pressure.

a result, the internal pressure of the tank is controlled in a suitable range between the predetermined positive pressure and the predetermined negative pressure during engine operating. Under such a condition, the electronic control system controls to close the pressure control valve and the evaporation passage is closed.

Therefore, the fuel vapor adsorbed in the canister is surely purged, and is drawn to the intake system of the engine.

DETAILED DESCRIPTION OF PREFERRED EMBODIMENTS

Figure 1:
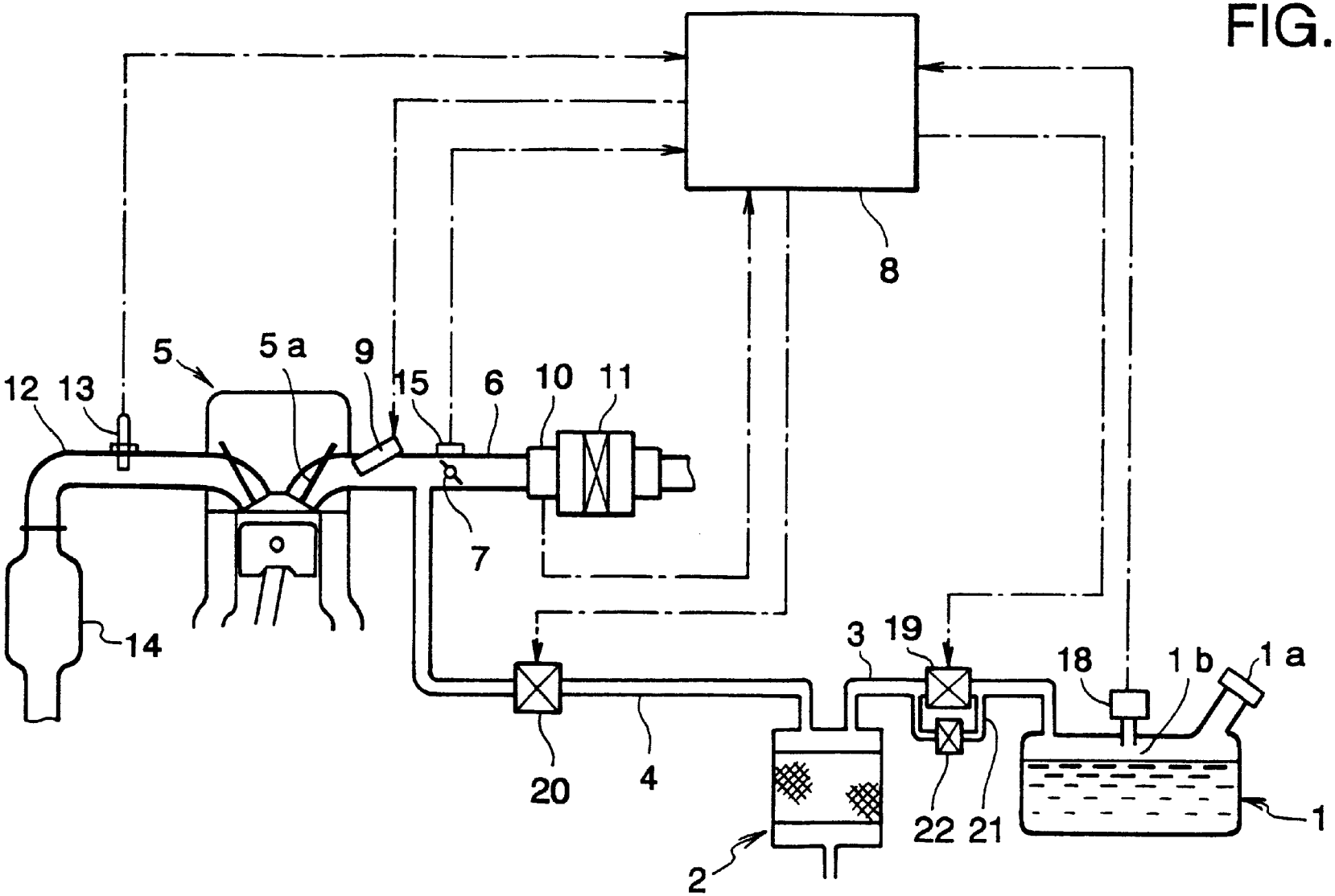
FIG. 1 is a schematic diagram showing an embodiment according the present invention.

Referring now to FIG. 1, numeral 1 denotes a fuel tank having a fuel filler cap 1a, and numeral 2 is a canister communicated to an upper space 1b in the fuel tank 1 through a fuel vapor passage 3. The canister 2 is also communicated with a downstream of a throttle valve 7 in an intake passage 6 of an engine 5 through a purge passage 4.

The engine 5 is an electronically controlled engine in which a fuel injection amount and a fuel injection timing are controlled by an electronic control unit 8 (ECU) A a fuel injector 9 equipped downstream of the throttle valve 7 is provided to inject fuel in the intake passage. Upstream of the throttle valve 7 of the intake passage, an air flow meter 10 and an air cleaner 11 are disposed in this order. Further, on an exhaust passage 12, an $O_2$ sensor 13, and a catalytic converter 14 are provided respectively. The fuel injector 9 is communicated with the fuel tank 1 through a fuel supply passage (not shown).

Figure 2:
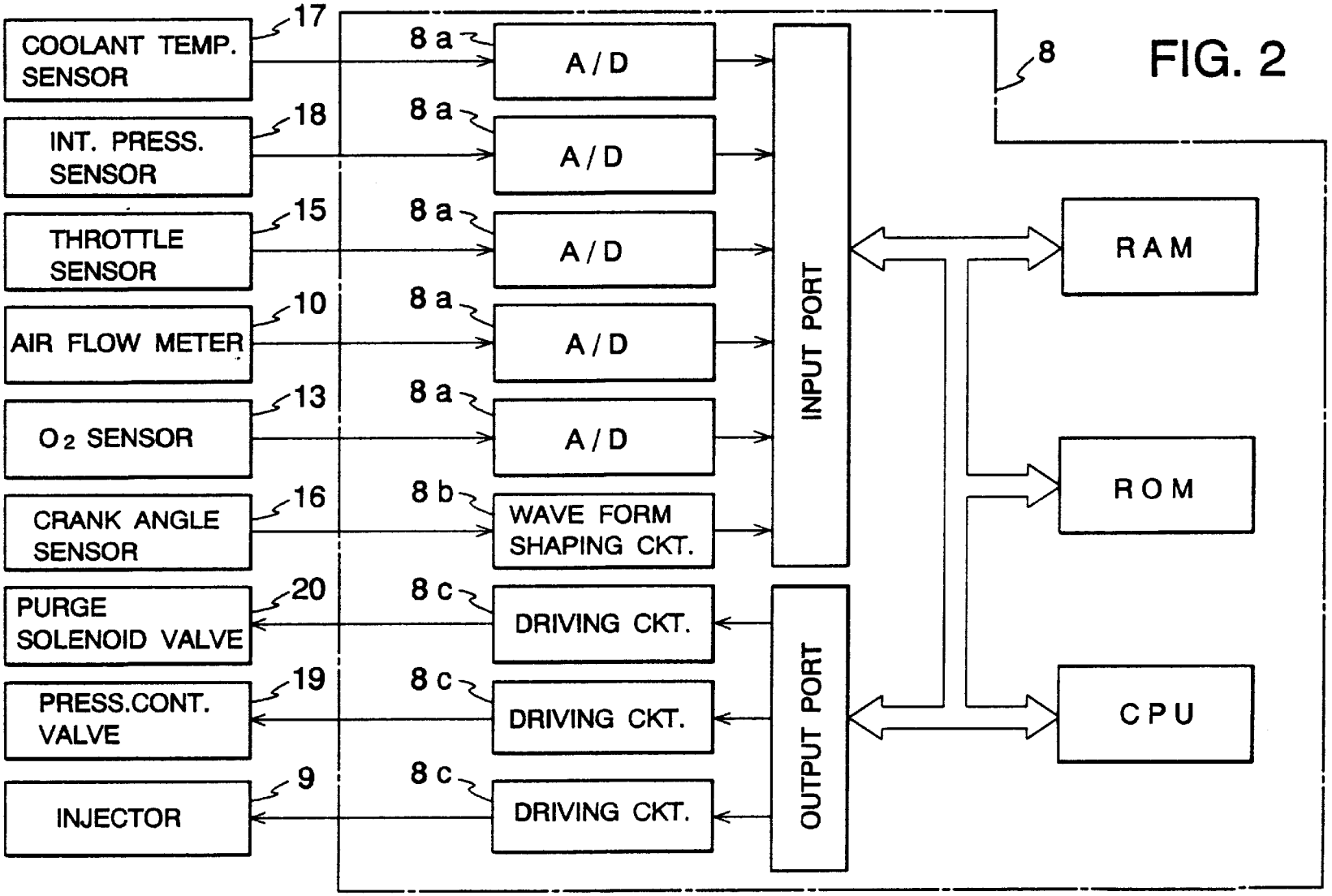
FIG. 2 is a block diagram showing an data processing of an embodiment according to the present invention.

The electronic control unit 8 is a micro-computer comprising a CPU, a RAM, and input ports connected with each other through bus lines, as shown in FIG. 2. Further, a plurality of A/D converters 8a and waveform shaping circuits 8b are connected to the inputs and a plurality of driver circuits 8c are communicated to the output port. A throttle opening angle sensor 15 mounted on the throttle valve 7 for detecting a throttle opening angle generates a throttle opening signal to the A/D converter 8a. An intake air amount signal from the air flow meter 10 and air fuel ratio signal from the $O_2$ sensor 13 are inputted through A/D converters 8a respectively. Further, a crank angle signal from crank angle sensor is inputted through the waveform shaping circuit 8b to the input port. Further, a fuel injection signal for the fuel injector are output to the driver circuit 8c connected to the output port.

Further, a water temperature signal from a water temperature sensor 17 to detect a temperature of the engine cooling water and a pressure signal from a pressure sensor 18 provided in the upper space of the fuel tank 1 to detect a pressure P therein input to the input port through the A/D converters 8a respectively. There are provided a pressure control valve (PCV) 19 mounted on the fuel vapor passage 3 and a purge solenoid valve 20 mounted on the purge passage 4 which are subjected to an on-off control through the driver circuits 8c communicated to the output port.

The pressure control valve (PCV) 19 is normally closed valve provided to open the fuel vapor passage 3 at turning on the electricity, and to close the fuel vapor passage 3 at turning off the electricity. Further, the purge solenoid valve 20 mounted on the purge passage 4 which is normally closed valve to close the purge passage 4, is provided to control purge quantity from 0% in full closing to 100% in full opening according to duty ratio signals.

A bypass passage 21 provided on the fuel vapor passage 3 for bypassing the pressure control valve (PCV) 19 and provides a mechanical type two way valve 22 to be opened by pressure difference therein.

Figure 3:
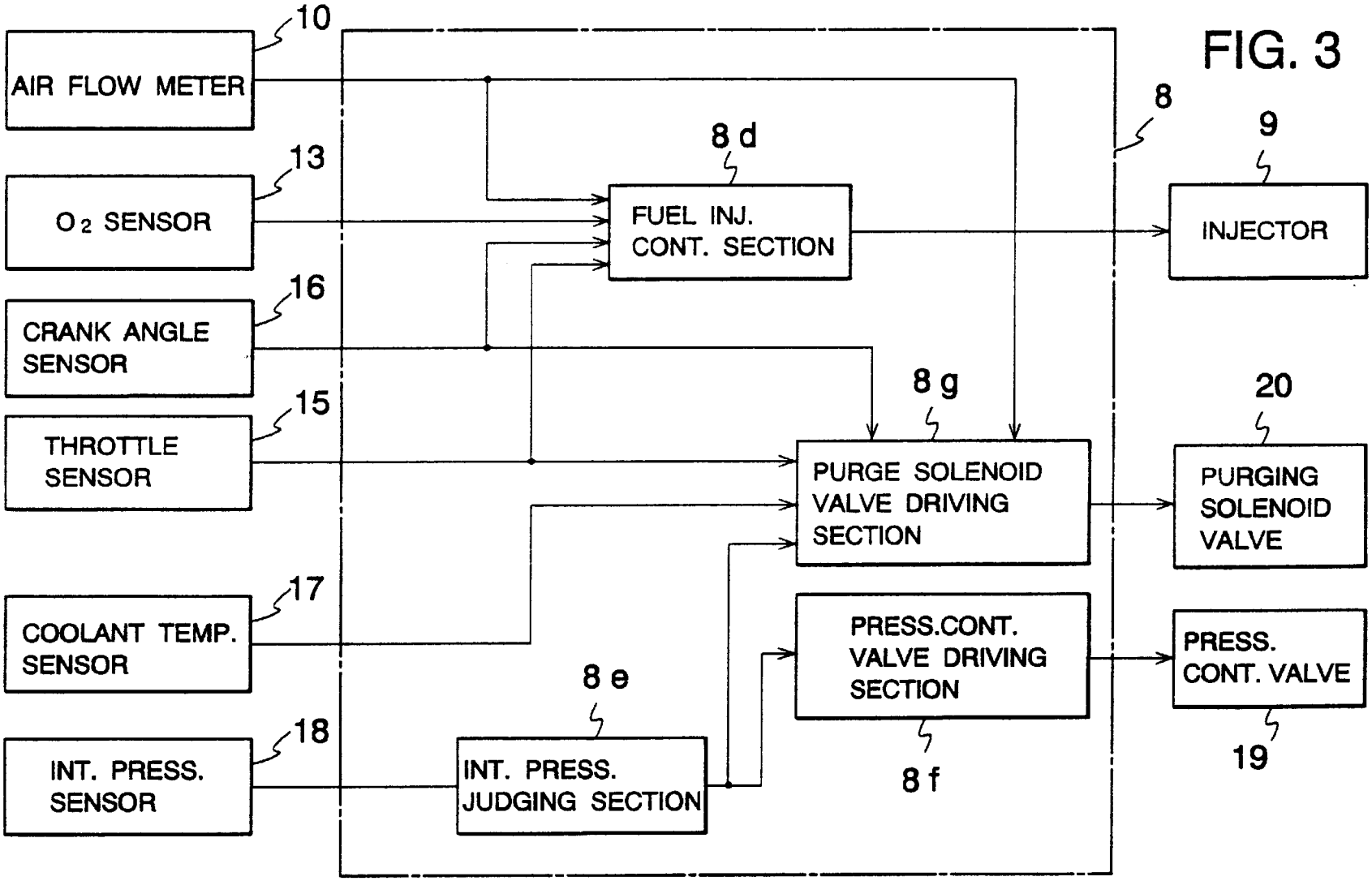
FIG. 3 is a block diagram showing a function of an electronic control unit of an embodiment according to the present invention.

FIG. 3 shows a block diagram processing the function in the electronic control unit 8 which comprises a fuel injection control section 8d to control the fuel injector 9, a purge solenoid valve control section 8g to control the purge-solenoid valve 20 and a pressure control valve driving section 8f in response to an internal pressure judging section 8e to drive the pressure control valve (PCV) 19.

The fuel injection control section 8d responsive to the throttle opening signal from the throttle opening angle sensor 5, the intake air amount signal from the air flow meter 10 and the air fuel ratio signal from the $O_2$ sensor 13 through the A/D converters 8a and further responsive to the crank angle signal from a crank angle sensor 16 through the waveform shaping circuit 8b is provided to generate a fuel injection amount to the injector 9 through the driver circuits 8c connected to the output ports.

The electronic control unit 8 provides the internal pressure judging section 8e responsive to an internal pressure signal from an internal pressure sensor 18, the pressure control valve driving section 8f, and the purge solenoid valve control section 8g. The internal pressure judging section 8e comprises four predetermined pressure values which indicate a first predetermined negative pressure value P1 and a second predetermined positive pressure value P2, a third predetermined negative pressure value P3, and a forth predetermined positive pressure value P4.

For example, these four predetermined pressure values indicate a value of 1000 Pa for the first predetermined negative pressure value P1, a value of 1500 Pa for the second predetermined positive pressure value P2, a value of −500 Pa higher than the first predetermined negative pressure value P1 for the third predetermined negative pressure value P3, and a value of 1000 Pa lower than the second predetermined positive pressure value P2 for the forth predetermined positive pressure value P4, respectively.

In addition, the internal pressure judging section 8e responsive to the internal pressure signal makes a decision of four pressure zones and outputs four internal pressure judging signals which are denoted a A signal, B signal, C signal, and D signal corresponding to four pressure zones.

Figure 4:
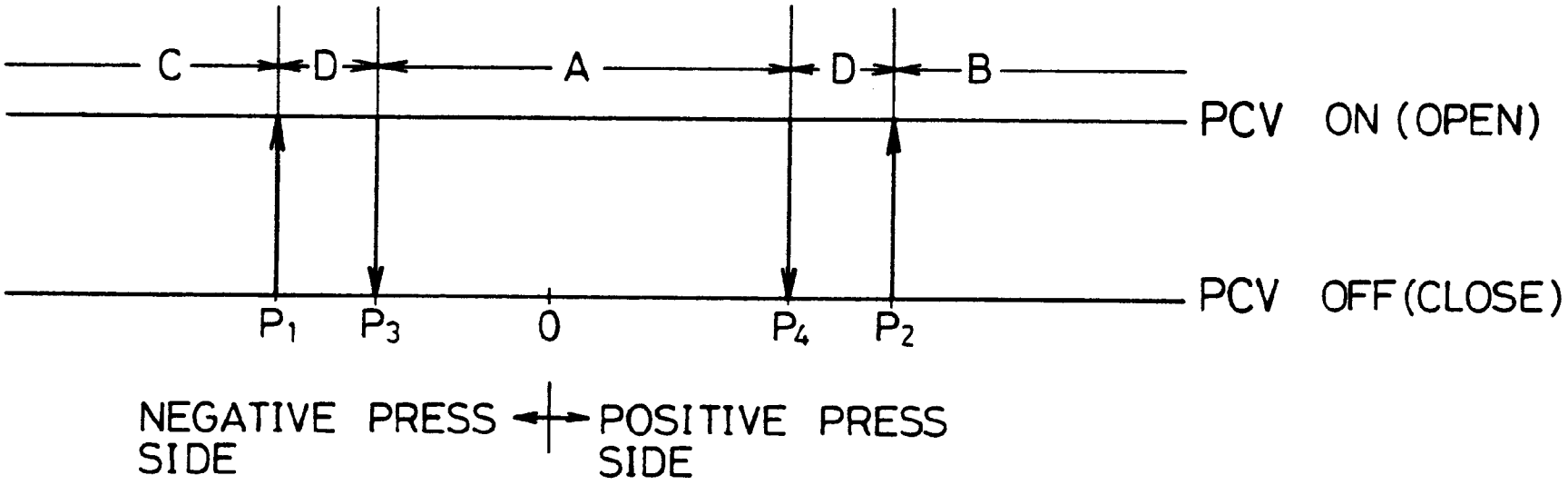
FIG. 4 is a chart diagram showing an on - off timing of a pressure control valve of an embodiment according to the present invention.

As shown in FIG. 4, the internal pressure judging section 8e responsive to the internal pressure signal decides four pressure zones which are a normal pressure zone A when the internal pressure is between the third predetermined negative pressure value P3 and the forth predetermined positive pressure value P4, an excessive positive pressure zone B when the internal pressure is excessive the second predetermined positive pressure value P2, an excessive negative zone C when the internal pressure is below the first predetermined negative pressure value P1, and a dead zone D when the internal pressure is between the forth predetermined positive pressure value P4 and the second predetermined positive pressure value P2 or between the first predetermined negative pressure value P1 and the third predetermined negative pressure value P3, and generates A, B, C, or D signal corresponding to each decided zone, respectively.

Moreover, the pressure control valve driving section 8f responsive to the pressure zone signals generates a pressure control valve (PCV) OFF signal when the pressure control valve driving section 8f inputs A signal, a pressure control valve (PCV) ON signal when the pressure control valve driving section 8f inputs the B or C signal, and further generates the PCV ON signal or the PCV OFF signal corresponding to the previously inputted internal pressure judging signal A, B, or C when the pressure control valve driving section 8f inputs D signal, to the pressure control valve (PCV) 19 through the driver circuits 8c.

In addition, the purge solenoid valve driving section 8g outputs a predetermined duty ratio signal to the purge solenoid valve through the driving circuit.

Basically, the predetermined duty ratio signal is output to the purge solenoid valve 20 based on the crank angle signal from the crank angle sensor 16 through the waveform shaping circuit 8b and the intake air amount signal from the air flow sensor 10 through the A/D converter 8a. The purge solenoid valve 20 controls the purge passage 4 to be opened by the predetermined duty ratio when the engine is after the warming - up and the opening degree of the throttle valve is exceeded the idling opening, and to be closed other than the above conditions.

Further, the purge solenoid valve driving section 8g response to the internal pressure judging signal C to output 0% duty signal to the purge solenoid valve (PSV) 20 through the driving circuit 8c.

Next, the internal pressure adjusting device for the fuel tank 1 according to the embodiment thus constituted will be explained.

First, while the engine is not operating, the electric control unit 8 is non operating and the normally closed pressure control valve (PCV) is closing the fuel vapor passage 3.

Therefore, the fuel vapor stays in the upper space of the fuel tank 1 even if a large amount of evaporation fuel is generated in the upper space 1b when the fuel temperature rises by the influence of increasing the outer air temperature, etc. As a result, the fuel vapor never carelessly flows out to an atmosphere through canister 2.

Figure 5:
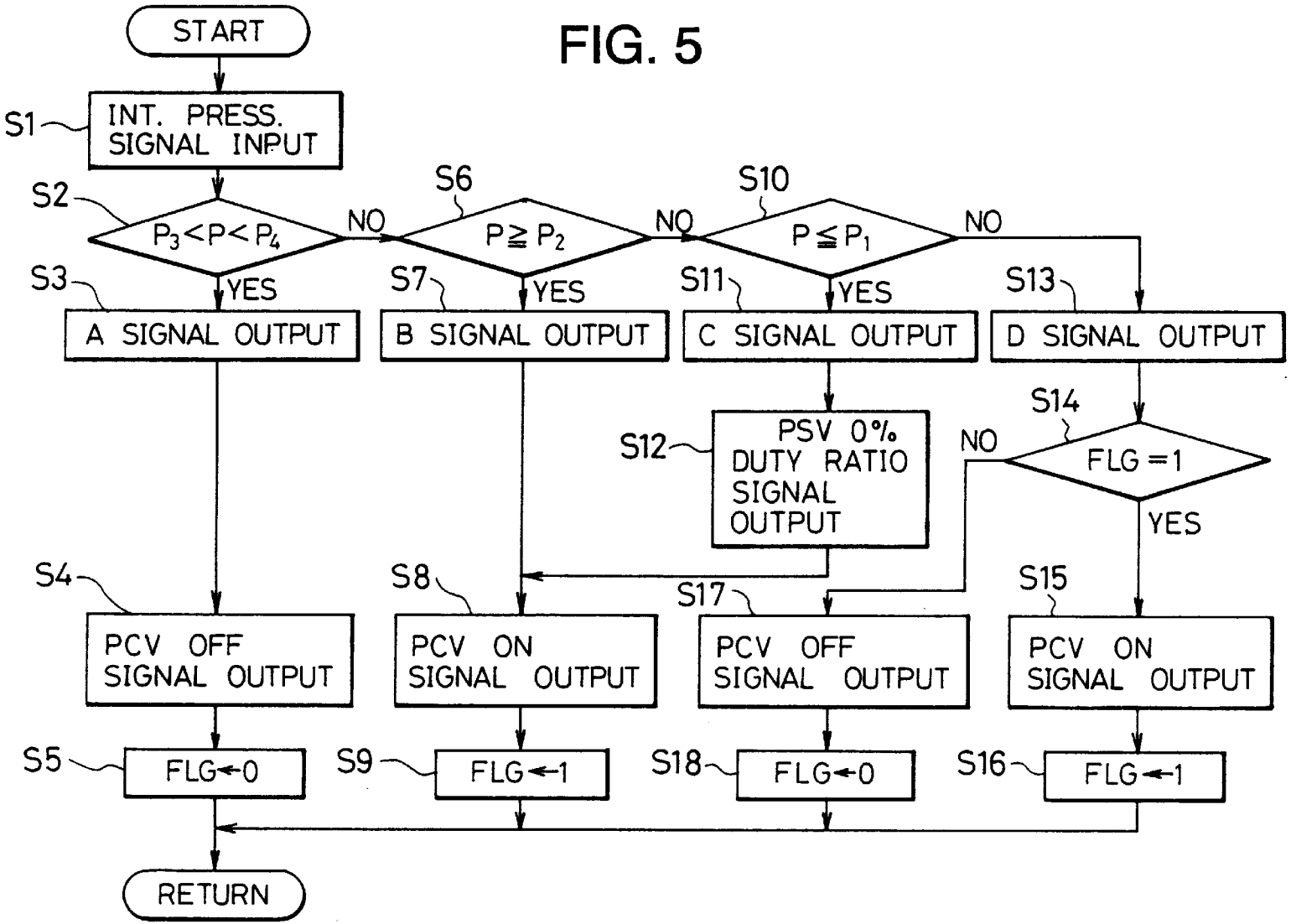
FIG. 5 is a flow chart showing a function of an embodiment according to the present invention.

While the engine is operating, the pressure control valve (PCV) 19 and the purge solenoid valve (PSV) 20 are controlled by the electrical control unit 8 responsive to the internal pressure from the internal pressure sensor 18, whereby the internal pressure of the fuel tank 1 is prevented exceeding more than the second predetermined pressure P2 for example 1500 Pa or less than the first predetermined pressure P1 for example −1000 Pa in accordance with the flowchart as shown FIG. 5.

Referring now to FIG. 5, first at a Step S1, the internal pressure signal from the internal pressure sensor 18 is input to the internal pressure judging section 8e, and at the internal pressure judging section 8e makes judgment whether the internal pressure in the fuel tank 1 is in a normal range between the fourth predetermined pressure P4 for example 1000 Pa and the third predetermined pressure P3 for example - 500 Pa.

At Step S3, the internal pressure judging section 8e outputs the A signal to the pressure control driving section 8f as the internal pressure judging signal when the judging result at Step S2 (S2) is YES.

At Step S4, the pressure control driving section 8f outputs a PCV OFF signal to the pressure control valve 19 through the driving circuit 8c, and a flag is to be 0 at a Step 5.

Therefore, when the internal pressure P in the fuel tank 1 is within the normal zone A which is defined by the negative pressure P3 and the positive pressure P4, the pressure control valve 19 is controlled to be closed and the fuel vapor passage 3 is closed. As a result, the negative pressure in the intake passage 6 of the engine 5 surely acts on the canister 2 through purge passage 4 while the purge solenoid valve (PSV) 20 opens by the predetermined duty ratio.

Therefore, the fuel vapor adsorbed in canister 2 surely purges, and the fuel vapor adsorption ability of the canister 2 recovers promptly.

At Step S6, the internal pressure judging section 8e decides whether the internal pressure in the tank 1 is in the excessive positive zone B more than the predetermined positive pressure P2, for example 1500 Pa, when the judgment is NO at Step 2.

At Step S7, the internal pressure judging section 8e outputs the B signal as the internal pressure signal to the pressure control driving section 8f when the judgment is YES at the Step S6.

At a Step S8, the pressure control driving section 8f outputs the PCV ON signal to the pressure control valve 19 through the driving circuit 8c, and a flag is to be 1 at a Step S9.

Therefore, the pressure control valve 19 is controlled by the open control so that the fuel vapor passage 3 is opened, when the upper space 1b in the fuel tank 1 is filled with the large amount of the fuel vapor, and the internal pressure in the tank 1 is in the excessive positive pressure zone B above more than the second predetermined pressure P2 for example 1500 Pa.

As a result of that, the internal pressure P of upper space 1b in fuel tank 1 promptly descends to less than the second predetermined pressure P2 according to absorbing the fuel vapor into the canister 2 through the fuel vapor passage 3.

Therefore, the fuel vapor in the fuel tank 1 flowing out to the atmosphere is very little even if the fuel filler cap 1a of fuel tank 1 is opened when refueling.

At Step S10, the internal pressure judging section 8e makes a decision whether the internal pressure P of upper space 1b in fuel tank 1 is in the excessive negative zone C below the first predetermined negative pressure value P1 for example - 1000 Pa, when the Step S6 is NO.

At Step S11, the internal pressure judging section 8e outputs the C signal as an internal pressure judging signal to the purge solenoid valve driving section 8g and the pressure control driving section 8f, when the Step 10 is YES.

As a result, the pressure control driving section 8f outputs a PCV ON signal to the pressure control valve (PCV) 19 through the driving circuit 8c (Step S8) and the flag is set to be 1 (Step S9).

Therefore, the purge passage 4 is to be closed by close-controlling the purge solenoid valve (PSV) 20, and then the fuel vapor passage is to be opened by open-controlling the pressure control valve (PCV) 19, when the internal pressure P of the upper space 1b in the fuel tank 1 descends within the excessive negative zone C below the first predetermined negative pressure value P1 for example - 1000 Pa by causes of decreasing the fuel temperature in the fuel tank 1 or rising the atmospheric pressure etc.

Therefore, the internal pressure P of the upper space 1b in the fuel tank 1 promptly rises above the first predetermined negative pressure value P1 according to flow of atmospheric air from canister 2 to the upper space 1b in the fuel tank 1 through the fuel vapor passage 3.

As a result of that, the fuel tank 1 is prevented from damages according to an excessive negative pressure.

At Step S13, the internal pressure judging section 8e outputs the D signal as the internal pressure judging signal to the pressure control driving section 8f according to the internal pressure P in the fuel tank 1 within the dead zone D between the predetermined positive pressure value P4 (for example 1000 Pa) and the predetermined positive pressure value P2 (for example 1500 Pa), or the internal pressure P in the fuel tank 1 within the dead zone D between the predetermined negative pressure value P3 (for example - 500 Pa) and the predetermined negative pressure value P1 (for example - 1000 Pa), when the Step S10 is NO.

Then, the pressure control driving section 8f judges whether the flag is 1 or not at Step 14, and continuously outputs the PCV ON signal to the pressure control valve 19 at Step S15 and maintains the flag 1 at Step S16 when the judgment thereof is 1 for YES.

At Step S17, the pressure control driving section 8f continuously outputs the PCV OFF signal to the pressure control valve 19 and maintains the Flag 0 at Step S18 when the judgment at the Step S14 is 0 for NO.

Therefore, the pressure control valve 19 is continuously controlled by the closed control when the internal pressure P in the fuel tank 1 increases to the dead zone D between the positive pressure value P4 and the positive pressure value P2 from the normal pressure zone A between the negative pressure value P3 and the positive pressure value P4 or when the internal pressure P in the fuel tank I decreases to the dead zone D between the negative pressure value P3 and the negative pressure value P1.

Otherwise, the pressure control valve 19 is continuously controlled by the opened control when the internal pressure P descends a the dead zone D between the positive pressure value P4 and the positive pressure value P2 from the excessive positive pressure zone B defined by the positive pressure value P2. As lower limit As a result, the hunting of the pressure control valve 19 is prevented.

Further, set values of the above-mentioned negative pressure value P1, positive pressure value P2, negative pressure value P3, and positive pressure value P4 are expressed as a example, and may be changed other proper values.

In summary, according to the present invention, the fuel vapor passage is closed by the normally closed pressure control valve, and the fuel vapor generated in the upper space of the fuel tank can be prevented from flowing out to atmosphere through the canister at the engine operating condition.

Further, the electronic control unit controls the pressure control valve to open the fuel vapor passage. As a result, the fuel vapor filled in the upper space of the fuel tank is promptly adsorbed by the canister through the fuel vapor passage and the internal pressure in the fuel tank decreases below the predetermined positive pressure promptly. Therefore, the excessive fuel vapor generating at refueling in the fuel tank is prevented from flowing out to the atmosphere.

Otherwise, the electronic control unit opens the pressure control valve, and closes the purge solenoid valve to open that the fuel vapor passage and to close the purge passage. The internal pressure in the fuel tank promptly increases over the predetermined negative pressure according to flowing the atmosphere in the fuel tank through the fuel vapor passage. As a result, the fuel tank can be prevented from damage when the internal pressure in the tank decreases in excessively negative pressure, On the other hand, the electronic control unit actuates the pressure control valve to close the fuel vapor passage when the internal pressure in the tank is between the predetermined positive pressure and the predetermined negative pressure at operating the engine.

As a result, the negative pressure in the intake passage acts on the canister surely through the purge passage when the purge solenoid valve is opened by the opening control according to operating condition of the engine. Therefore, the fuel vapor adsorption ability of the canister is promptly recovered by surely purging the fuel vapor absorbed in the canister.

While the presently preferred embodiment of the present invention has been shown and described, it is to be understood that this disclosure is for the purpose of illustration and those various changes and modifications may be made without departing from the invention as set forth in the appended claims.

What is claimed is:

1. An internal pressure [adjusting] *control* device for a fuel tank mounted on a vehicle having, a canister connected to said fuel tank for adsorbing fuel vapor, a pressure sensor mounted on said fuel tank for sensing an internal pressure of an upper portion of said fuel tank and for producing a pressure signal, an air flow meter inserted in an intake passage of an engine for measuring an amount of induced air and for generating an air amount signal, a crank angle sensor mounted on said engine for detecting an engine speed and for producing an engine speed signal, a throttle sensor provided near a throttle valve for sensing an opening degree of said throttle valve and for outputting a throttle signal, coolant temperature sensor mounted on said engine for detecting an engine temperature and for generating a temperature signal, a normally-closed control valve interposed in a fuel vapor passage between said fuel tank and said canister for controlling an amount and pressure of fuel vapor generated in an upper portion of said fuel tank, and a purge solenoid valve connected between said canister and said intake passage for purging said fuel vapor into said intake passage, comprising:

internal pressure judging means responsive to said pressure signal for comparing said internal pressure with four predetermined threshold values of pressure and for generating a pressure signal corresponding to said each value;

purge solenoid valve driving means responsive to said air amount signal, said engine speed signal, said throttle signal, said temperature signal and said pressure signal for opening said purge solenoid valve when said engine is operating in a predetermined condition; and pressure control valve driving means responsive to said pressure signal for opening and closing said pressure control valve so as to maintain said internal pressure at an optimum value without overflowing said fuel to outside and without damaging said fuel tank.

2. The internal pressure control device according to claim 1, wherein said [electronic] *pressure* control *valve driving* means responsive to the [internal] pressure *signal* closes said pressure control valve when the internal pressure is in a range between a predetermined negative pressure and a predetermined positive pressure and opens said purge solenoid valve when the internal pressure goes above said predetermined positive pressure.

3. The internal pressure control device according to claim 1, wherein said [electronic] *pressure* control *valve driving* means responsive to said [internal] pressure *signal* opens said pressure control valve and closes said purge solenoid valve when said internal pressure goes below a predetermined negative pressure.

4. An internal pressure control method for an upper space of a fuel tank mounted on a vehicle having a normally closed type pressure control valve provided to control a fuel vapor passage communicating between an upper space of the fuel tank and a canister and a purge solenoid valve provided to control a purge passage communicating between the canister and an intake passage of an engine, comprising, establishing four predetermined threshold pressure values, closing said pressure control valve when the internal pressure is in a range between a predetermined negative pressure and a predetermined positive pressure, and opening said purge solenoid valve when the internal pressure goes above said predetermined positive pressure.

5. The internal pressure control method according to claim 4, the improvement which further comprises, opening said pressure control valve and closing said purge solenoid valve when said internal pressure goes below a predetermined negative pressure.

* * * * *